United States Patent [19]
Bremer et al.

[11] Patent Number: 5,881,047
[45] Date of Patent: Mar. 9, 1999

[54] SIMULTANEOUS ANALOG AND DIGITAL COMMUNICATION WITH IMPROVED PHASE IMMUNITY

[75] Inventors: Gordon Bremer; Kenneth David Ko, both of Clearwater; Luke J. Smithwick, New Port Richey, all of Fla.

[73] Assignee: Paradyne Corporation, Largo, Fla.

[21] Appl. No.: 327,270

[22] Filed: Oct. 21, 1994

Related U.S. Application Data

[63] Continuation of Ser. No. 76,659, Jun. 14, 1993, abandoned.

[51] Int. Cl.$^6$ ................................................. H04J 11/00
[52] U.S. Cl. ........................................... 370/207; 370/527
[58] Field of Search ................................ 370/11, 12, 19, 370/20, 21, 69.1, 118, 119, 110.4, 204, 215, 203, 206, 208, 527, 477, 207, 537; 375/3, 38, 37, 39, 260, 222, 201; 371/43; 358/5, 6

[56] References Cited

U.S. PATENT DOCUMENTS

| | | | |
|---|---|---|---|
| 4,013,841 | 3/1977 | Ohkubo et al. | 381/5 |
| 4,016,366 | 4/1977 | Kurata | 381/5 |
| 4,464,767 | 8/1984 | Bremer | 370/118 |
| 4,512,013 | 4/1985 | Nash et al. | 370/69.1 |
| 4,523,311 | 6/1985 | Lee et al. | 370/69.1 |
| 4,525,846 | 7/1985 | Bremer et al. | 375/39 |
| 4,546,212 | 10/1985 | Crowder, Sr. | 179/2 C |
| 4,627,077 | 12/1986 | Armstrong | 375/39 |
| 4,630,287 | 12/1986 | Armstrong | 375/39 |
| 4,672,602 | 6/1987 | Hargrave et al. | 370/58 |
| 4,675,880 | 6/1987 | Davarian | 375/39 |
| 4,757,495 | 7/1988 | Decker et al. | 370/76 |
| 4,924,516 | 5/1990 | Bremer et al. | 380/46 |
| 5,050,189 | 9/1991 | Cox et al. | 375/39 |
| 5,081,647 | 1/1992 | Bremer | 375/5 |
| 5,103,227 | 4/1992 | Betts | 341/61 |
| 5,710,754 | 1/1998 | Kaku et al. | 370/527 |

FOREIGN PATENT DOCUMENTS

0552034 A2  7/1993  European Pat. Off. .......... H04L 5/02

OTHER PUBLICATIONS

Wozencraft et al., Principles of Commnication Engineering, Jan. 1967, pp. 222–227.

Lim, T. L., et al "Adaptive Equalization and Phase Tracking for Simultaneous Analog/Digital Data Transmission" The Bell System Technical Journal, vol. 60, No. 9, Nov. 1981, pp. 2039–2063.

Fumio Akashi, et al., "High–Speed Digital and Analog parallel Transmission Techique Over Single Telephone Channel", IEEE Transactions on Communications, vol. Com–30, No. 5, May 15, 1982, pp. 1213–1218.

R. Steele, et al., "Simultaneous Transmission of Speech and Data Using Code–Breaking Techniques", The Bell System Technical Journal, vol. 60, No. 9, Nov. 1981, pp. 2081–2105.

B. Widrow, et al., "Adaptive Noise Cancelling: Principles and Applications", Proceedings of the IEEE, vol. 63, No. 12, Dec., 1975.

(List continued on next page.)

*Primary Examiner*—Chau Nguyen
*Attorney, Agent, or Firm*—Thomas, Kayden, Horstemeyer & Rislev, LLP

[57] ABSTRACT

A first phase change is introduced to an analog signal based on a symbol specified by a data signal, where the symbol is one of a plurality of symbols in a symbol constellation. The analog signal is added to the data signal to form a combined signal which is transmitted over a communication channel that introduces a channel phase change to the analog and data signals. After transmission through the communication channel, the combined signal comprises a phase changed analog signal and a phase changed data signal. A received symbol is specified by the phase changed data signal, and a phase shift is introduced to the phase changed analog signal based on the identity of the received symbol.

6 Claims, 11 Drawing Sheets

OTHER PUBLICATIONS

Stagg, L. J., et al., "An Integrated Digital Subscribers Speech and Data Service", ICC '80 Conf. Rec. vol. 3, Seattle, Wash.; Jun. 8–12, 1980, pp. 39.6.1–39.6.6.

Peled, A., et al "Frequency Domain Data Transmission Using Reduced Computational Complexity Algorithms", ICASSP 80 Proc. Denver, Colo., vol. 1, Apr. 9–11, 1980, pp. 964–967.

Adams, P. F., "Speech–band data modems", Electronic & Power, vol. 26, No. 9; Sep. 1980, pp. 733–736.

Bukhviner, V. E., "Speech and Data Transmission in ACS Telephone Channels," Telecomm. & Radio Eng., vol. 30/31; Jul. 1976, pp. 111–113.

Lockhart, G. B., et al., "Method for Superimposing Data on Amplitude–Modulated Signals", Electronics Letters, Apr. 29, 1982, vol. 18, No. 9, pp. 379–381.

Shum, M. N. Y., et al., "A New Generation of Speech Plus Data Multiplexer", Conf. on Communications and Equipment and Systems, Birmingham, England, Apr. 4–7, 1978, pp. 111–113.

SIMULTANEOUS ANALOG AND DIGITAL COMMUNICATION WITH IMPROVED PHASE IMMUNITY

This application is a continuation of application Ser. No. 08/076,659, filed on Jun. 14, 1993, now abandoned.

CROSS-REFERENCE TO RELATED APPLICATION

Related subject matter is disclosed in the application filed concurrently herewith and assigned to the same assignee hereof entitled "Simultaneous Analog and Digital Communication", inventors Gordon Bremer and Kenneth D. Ko.

FIELD OF THE INVENTION

This invention relates to simultaneous transmission of analog and digital signals and, more particularly, to simultaneous transmission of analog signals and digital signals in a non-multiplexed manner and in a co-extensive frequency band.

DESCRIPTION OF THE PRIOR ART

In the prior art, when voice and data is transmitted simultaneously over a channel, it is typically transmitted either via frequency-division multiplexing or time-division multiplexing. In frequency-division multiplexing, the data channel and the voice channel are allocated different sub-bands of the channel's bandwidth. Examples of that are U.S. Pat. No. 4,757,495, U.S. Pat. No. 4,672,602, and U.S. Pat. No. 4,546,212. In time-division multiplexing arrangements, voice signals are sampled, digitized and interleaved with digital data to form a single information stream which is communicated over the available channel. Practically every digital carrier system (e.g. the T1 carrier system) is an example of that.

U.S. Pat. No. 4,512,013, issued Apr. 16, 1985, presents an interesting approach that is close to a frequency division multiplexing arrangement for simultaneous voice and data. The arrangement filters the speech signal and adds thereto a modulated narrowband signal to form the transmitted signal. The narrowband modulated signal derives from a narrow-band digital input signal that is modulated with a carrier, thereby shifting the narrow-band up in frequency to a position in the spectrum where there is little speech energy. At the receiver, in reliance of the fact that the speech power is low in the narrowband occupied by the modulated digital signal, the digital signal is recovered through appropriate demodulation. Thereafter, the recovered digital signal is remodulated to replicate the transmitter's operation, adaptively filtered to account for channel characteristics, and subtracted from the received signal. The result is the received speech. As indicated above, one salient characteristic of that arrangement, as stated in col. 2, lines 13–18, is that ". . . an entire analog speech signal and a modulated data signal are capable of being transmitted over a normal analog channel by the multiplexing of the data signal within the portion of the normal analog speech signal frequency band where the speech signal is present and the power density characteristic thereof is low". As an aside, the U.S. Pat. No. 4,517,013 arrangement is half duplex.

In the modem art, digital information is communicated over a channel by converting the digital information to analog form. In the most basic form, a modem filters the digital signal (i.e., shifts it in frequency) to form a band-limited signal and modulates that signal to reside within the passband of the communication channel. In telephony, for example, that passband may be between 300 Hz and 3500 Hz. To increase the information-carrying capacity of the modulated signal, more sophisticated modems employ quadrature modulation. Quadrature modulation is often depicted as a two-dimensional signal space. Use of the signal space to send voice information is disclosed in U.S. Pat. No. 5,081,647 issued Jan. 14, 1992.

Use of the signal space to send data and voice in described is "High Speed Digital and Analog Parallel Transmission Technique Over Single Telephone Channel", Ajashi et al, IEEE Transactions on Communications, Vol. 30, No. 5, May, 1982, pp. 1213–1218. Unlike prior techniques, where analog and data were segregated into different time slots (TDM) or different frequency bands (FDM), they describe separating analog and data signals into the two different channels of the QAM system. That is, Ajashi et al suggest modulating the in-phase channel with the analog signal, and modulating the quadrature channel with the data signal. Building on that description and concerning themselves with channel equalization, Lim et al analyze equalizer performance in "Adaptive Equalization and Phase Tracking For Simultaneous Analog/Digital Data Transmission", BSTJ, Vol. 60 No. 9, Nov. 1981, pp. 2039–2063. (The 1981 BSTJ article cites the information of 1982 IEEE article as "unpublished work").

No one has achieved the ability to simultaneously sent both data and voice through both channels of a QAM system, and no one has achieved the ability to communicate both by data and analog, simultaneously, and in full-duplex, over a single bidirectional bandlimited communications channel.

SUMMARY OF THE INVENTION

When simultaneously transmitting an analog signal and a data signal it is desirable to provide phase immunity to the analog signal, to decrease the probability of misidentifying a received signal point and to maintain the pseudo-random nature of the overall signal. Phase immunity is desired so that phase shifts introduced by the communication channel do not affect the analog signal. Overall signal pseudo-randomness is desirable to maintain a channel spectrum that approaches a white spectrum; a near-white channel spectrum facilitates channel equalization.

Providing phase immunity to the data signal is well-known in the modem art and is carried out using techniques such as differential PSK. The present invention provides phase immunity to an analog signal transmitted simultaneously with a data signal, decreases the probability of misidentifying a received signal point and maintains a channel spectrum that approaches a white spectrum. These advantages are obtained by modifying the analog signal based on at least one of the components of the data signal.

In one embodiment, a complex analog signal is transmitted simultaneously with a data signal that has discrete values which specify signal points of a four signal point constellation. When the data signal specifies a signal point in the first, second, third or fourth quadrant, the analog signal is phase-shifted by 0 degrees, 90 degrees, 180 degrees and 270 degrees, respectively. When the combined analog and data signals are received, the analog signal is phase-shifted based on the quadrant in which the received signal point is located. When the received signal point is in the first, second, third or fourth quadrant, the analog signal is shifted by 0 degrees, 270 degrees, 180 degrees and 90 degrees, respectively. This compensates for the phase shift that was originally added and any phase shift that may have been introduced by the communication channel.

As an added benefit, the analog signal is pseudo-randomized by the phase shifts. This occurs because the analog signal is modified based on the data signal which is pseudo-randomized by a scrambler in the transmitter. Pseudo-randomizing the data signal is well known in the modem art. As a result, a near white channel signal spectrum is maintained and channel equalization is facilitated.

This invention provides a communication method in which an N dimensional signal is modified based on a characteristic of an M dimensional signal where the M dimensional signal specifies a symbol belonging to a symbol constellation. The N dimensional signal is added to the m dimensional signal to form a combined signal and the combined signal is transmitted to a receiver.

DETAILED DESCRIPTION

Figure 1:
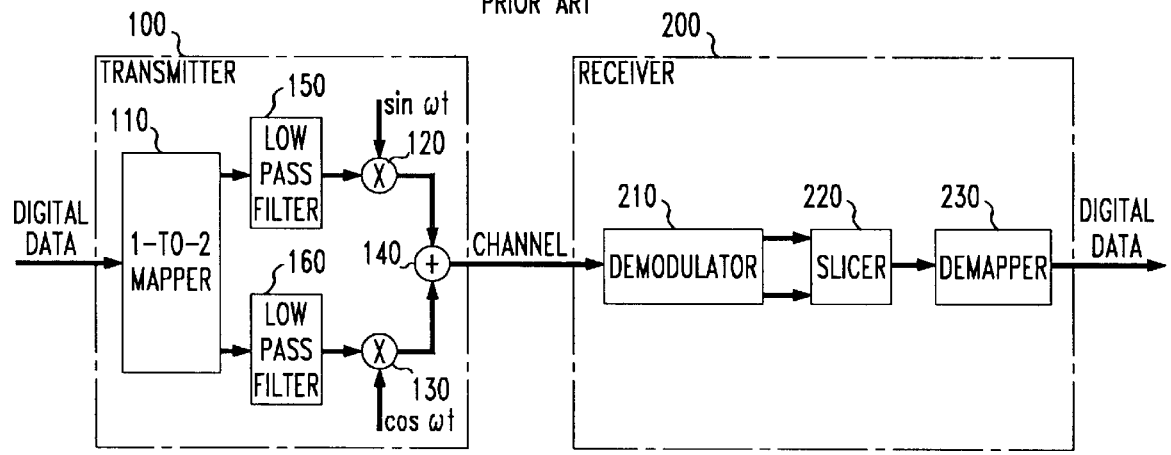
FIG. 1 presents the basic structure of a prior art modem.

To place this invention in context, FIG. 1 presents a very basic block diagram of a modem that communicates digital data via quadrature modulation techniques. Section 100 is the modem's transmitter section and section 200 is the modem's receiver section. Specifically, in the transmitter section digital data is applied in FIG. 1 to a 1-to-2 mapper 110, and mapper 110 develops two outputs which typically are referred to as the in-phase and quadrature samples. The in-phase samples are applied via low pass filter 150 to modulator 120, which multiplies the applied signal by a carrier—i.e, sin ωt in FIG. 1. The quadrature samples are applied via low pass filter 160 to modulator 130, which multiplies the applied signal by a second carrier. The second carrier is orthogonal to the first carrier; namely, cos ωt. Filters 150 and 160 must be bandlimited to no more than ω, in order to avoid aliasing and to at least half the inverse of the output sample rate of mapper 110. The output signals of modulators 120 and 130 are added in element 140 to develop the analog signal of the modem's transmitter section.

In operation, the digital data applied to the FIG. 1 apparatus is a stream of bits. Element 110 views the incoming signal as a stream of symbols that each comprises a preselected number of consecutive bits, and maps each symbol into an in-phase analog sample and a quadrature analog sample.

Figure 2:
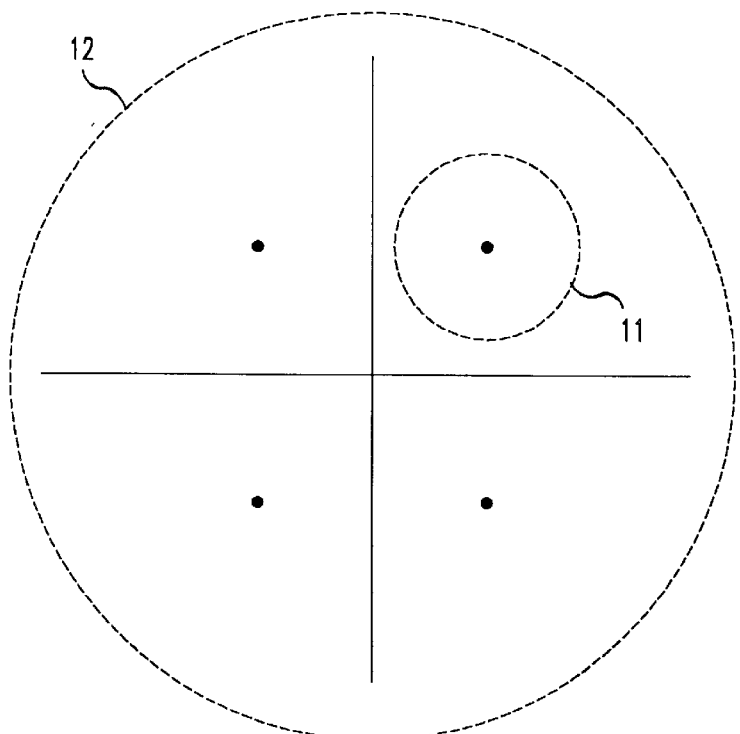
FIG. 2 shows the signal space and an illustrative signal constellation for the FIG. 1 system.

Practitioners in the art often describe the operations performed in the FIG. 1 apparatus by means of a signal space diagram, such as shown in FIG. 2. The x axis corresponds to one of the carrier signals (e.g., cos ωt) and the y axis corresponds to the other carrier signal (sin ωt). The in-phase and quadrature samples delivered by element 110, in effect, specify a location in the signal space of FIG. 2. Accordingly, the set of possible samples that element 110 can produce corresponds to a set of sample points (i.e., a constellation of points) in the signal space depiction of FIG. 2. A 4-point signal constellation is shown, by way of illustration, in FIG. 2. It is well known, however, that one can create signal point constellations with a larger number of signal points.

To receive signals that were modulated by the FIG. 1 apparatus in accordance with the specific constellation depicted in FIG. 2, one must only identify whether the received signal is in the first, second, third or fourth quadrant of the signal space. That means that there exists great latitude in the signals that are received, and any received signal that is still in the correct quadrant is mapped to the correct constellation signal point in that quadrant. Extended to other (and perhaps larger) constellations, the signal space can be divided into regions and the receiver's decision is made with respect to the region in which the received signal is located. We call these regions "neighborhood" regions.

Returning to FIG. 1 and addressing the modem's receiver section, the modulated signal is applied to demodulator 210. Demodulator 210 recovers the in-phase and quadrature components and applies them to slicer 220. Slicer 220 converts the in-phase and quadrature components into symbols and applies the symbols to de-mapper 230. De-mapper 230 maps the symbols into bit streams to form the recovered digital data stream.

Absent any signal degradation (such as due to noise added in the channel) the signal received by demodulator 210 would be precisely the same as the signal sent by adder 140, and a determination of neighborhood regions in which the signal is found (by slicer 220) would be relatively simple and error-free. However, noise that is added to the transmitted signal shifts the received signal in the signal space and modifies the input to slicer 220. Stated in other words, a noise signal that adds to the signal flowing through the communication channel corresponds to a vector signal in the signal space of FIG. 2 that is added to a transmitted sample point. That added vector is of unknown magnitude and unknown phase. Consequently, added noise converts a transmitted signal that corresponds to a point in the signal space into a region in the signal space. This phenomenon is depicted in FIG. 2 by circle 11. Some refer to this circle as a signal space "noise cloud" surrounding the transmitted signal.

From the above it is clear that in order to detect the transmitted signals without errors, the neighborhood regions must be large enough to encompass the noise cloud. Since the average power of the sent signal is typically limited by other considerations, the extent to which the signal constellation covers the infinite space represented by the x and y axes is also limited. This is represented in FIG. 2 by circle 12. The restriction imposed by circle 12, coupled with the restriction on the size of the neighborhood regions that is imposed by noise considerations limits the number of transmitted signal points in the constellation.

Figure 3:
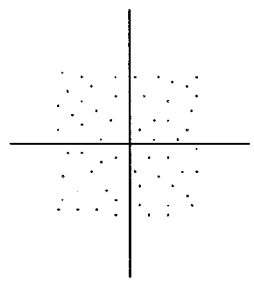
FIG. 3 shows the signal space of a QAM analog system.

As indicated above, it has been observed that in typical modem designs the allowable signal power and the expected fidelity of the channel combine to control the constellation size. Less noisy channels allow for larger constellations, and larger constellations permit higher digital data throughputs. This leads to a totally revolutionary idea of utilizing all, or essentially all, of the available signal space for the transmission of information. A transmitter signal space in accordance with this revolutionary approach is depicted in FIG. 3 where a plurality of signal points are depicted randomly within the signal space. These points are illustrative of the various vectors that the transmitter is allowed to send out. There are no more "constellations of points", where a decision must be made between constellation points; there is only the entirety of the signal space. In other words, rather than having digital signals that are mapped onto a fixed constellation within a signal space, FIG. 3 depicts analog signals that are mapped onto a signal space. When the analog signals that form the in-phase component are independent of the analog signals that form the quadrature component, the viable signal space of FIG. 3 may be rectangular.

Having recognized the advantages of sending analog signals in accordance with the signal space of FIG. 3, the next innovation is to alternate between the signal spaces of FIG. 2 and FIG. 3. That is, the innovation is to send customer analog signals or customer digital signals as the need arises. This is depicted in FIG. 4.

Figure 4:
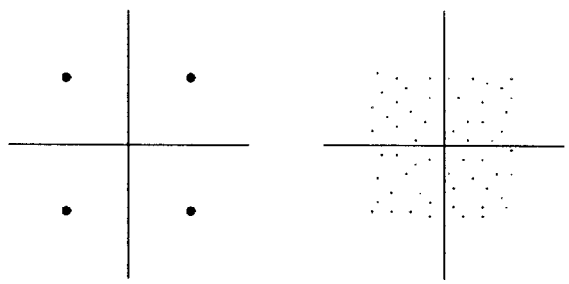
FIG. 4 shows the signal space of an alternating digital and analog system.

Further, having recognized the advantages of sending either analog or digital signals in accordance with the signal spaces of FIG. 4, it was discovered that a totally different communication approach can be taken, that communicating both analog and digital signals, can be expressed concurrently, in a combined signal space. This is illustrated in FIG. 5, where four neighborhoods are identified for illustrative purposes, with demarcation borders identified by dashed lines 21 and 22.

Figure 5:
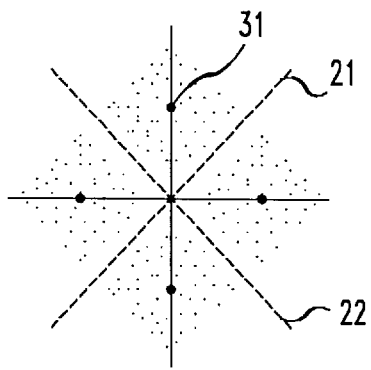
FIG. 5 shows the signal space of a combined digital and analog system.

It may be noted that, for purposes of this disclosure, according to the FIG. 5 depiction, the analog signals that form "signal clouds" around each digital constellation point (e.g., point 31) should be restricted in their dynamic range to be totally contained within the neighborhood regions. Hence, here too there is a trade-off between constellation size (which directly affects digital through-put) and dynamic range of the transmitted analog signal (which in some situations translates to "resolution").

Figure 6:
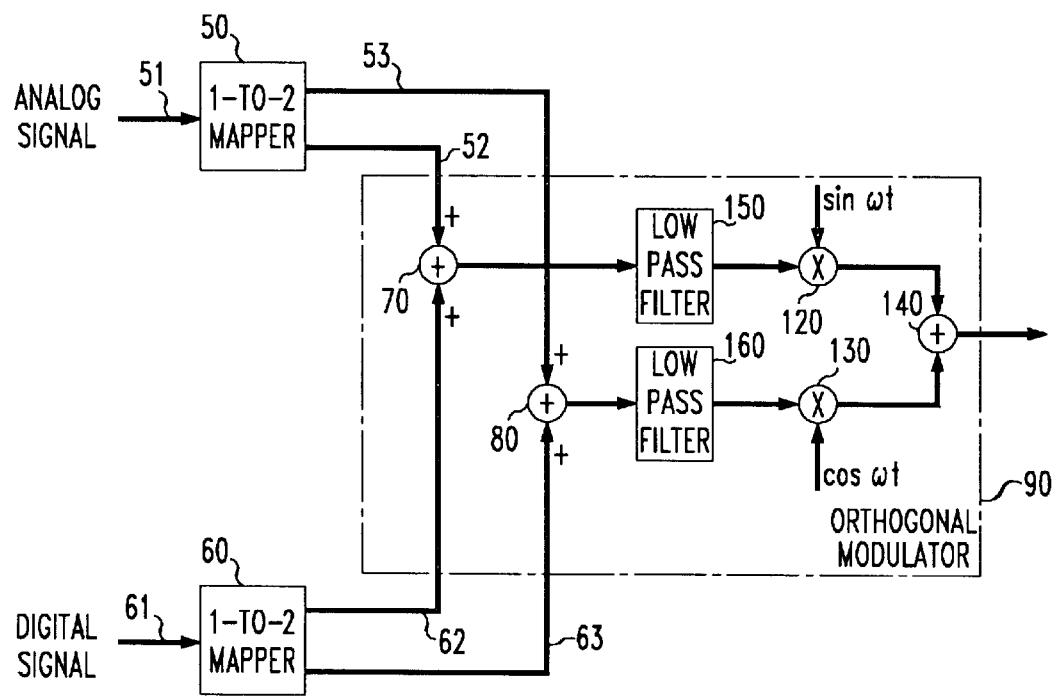
FIG. 6 presents one embodiment of a transmitter section for a combined digital and analog system.

FIG. 6 depicts an arrangement that very basically illustrates the principles of this invention. It includes a 1-to-2 dimensional mapper 60 responsive to digital signals applied on line 61. Mapper 60 develops two output signals on lines 62 and 63, each of which possesses pulses with quantized amplitudes that relate to the digital signals arriving on line 61. FIG. 6 also includes a 1-to-2 mapper 50 that responds to an applied analog signal on line 51, and it develops two output signals on lines 52 and 53, each of which possesses pulses with continuous amplitudes that relate to the analog signal on line 51. Outputs 52 and 62 are combined in adder 70 and outputs 53 and 63 are combined in adder 80. The outputs of adders 70 and 80 form the components of the signals that are represented by the signal space of FIG. 5. As in FIG. 1, the outputs of adders 70 and 80 are applied via low pass filters 150 and 160 to modulators 120 and 130 and summed in adder 140 to form a modulated signal as is typically known in the modem art.

In FIG. 6 element 60 is depicted as a 1-to-2 mapper. However, it should be understood that element 60 can be an M-to-N mapper. That is, element 60 can be responsive to a plurality (M) of digital signals and it can develop a different plurality (N) of output signals. Similarly, element 50 can be a J-to-K encoder that is responsive to a plurality of analog signals. Likewise, the collection of elements that follow elements 50 and 60 (i.e., elements 70, 80, 120, 130, 140, 150 and 160), which form orthogonal modulator 90 can be constructed to be responsive to whatever plurality of outputs of that elements 50 and 60 are designed to produce. More specifically, those elements must account for all of the applied input signals, and that means that they must be able to handle K or N signals, whichever is larger. In such a circumstance, however, the user can assume that the larger of the two (K or N) is the dimensionality of the system, and some of the dimensions have either no digital data, or no analog data, whichever applies. Of course, if there are "dimensions" for which there is no digital or analog data, other information can be sent over those dimensions, such as equalization "side" information.

Figure 7:
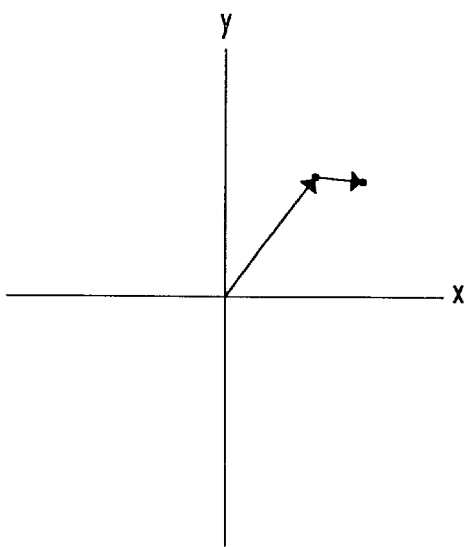
FIG. 7 presents one orthogonal modulation approach.

In the context of a signal space, the N pluralities of output signals of elements 50 and 60 (assuming N is larger than K) correspond to the collection of components of vectors in multi-dimensional space; e.g., N-dimensional space. The coordinates of this multi-dimensional space correspond to the orthogonal modulation signals within orthogonal modulator 90. In FIG. 6, the two orthogonal modulation signals are $\cos \omega t$ and $\sin \omega t$, but other modulation signals are also possible; for example, code division multiplexing (CDMA) templates. For purposes of this invention, orthogonal modulation signals are modulation signals that develop a transmitted signal comprising concurrent element signals and yet allow the receiver to separate the received signal into its constituent element signals, those being the signals developed in response to each of the modulation signals. It may also be observed that, relative to FIG. 5, orthogonal modulator 90 performs vector summation of the symbol vector represented by the components developed by element 60 with the analog information vector represented by the components developed by element 50. This is depicted in FIG. 7.

Figure 8:
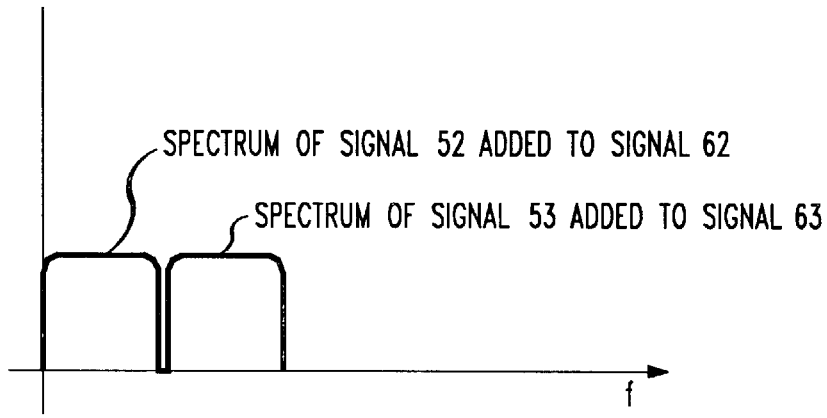
FIG. 8 depicts the vector addition that forms the signal space of FIG. 5.

In connection with FIG. 1, it may be noted in passing that the principles of this invention may be utilized even when the output signals of adders 70 and 80 are communicated (e.g., transmitted) directly, without the benefit of combining them in orthogonal modulator 90. Also, orthogonal modulator 90 can simply be a band-shifting means. To the extent that the output of adder 70 (for example) is band-limited, the output of adder 80 can be shifted beyond the band-limited output signal of adder 70 and combined with the output signal of adder 70. This is presented in FIG. 8. It may also be appreciated that the principles of this invention may be exercised without the use of element 60 in those situations where no digital streams are presented.

To this point in the instant disclosure the implication has been that the input signal applied to element 50 of FIG. 6 is analog. However, that does not have to be strictly the case. In accordance with conventional techniques, an analog signal that is bandlimited can be sampled (within the proper Nyquist bounds). Hence, it should be understood that the input signal to element 50 can be a sequence of analog samples. Moreover, a sampled analog signal can be quantized and represented in digital form. Indeed, an analog signal that has been sampled and converted to digital form can then be converted to amplitude quantized pulse amplitude-modulated format. All of those representations are representations of an analog signal. For example, the collection of the amplitude-quantized PAM pulses is identical to the original analog signal within the bounds of the quantization errors introduced by the sampling and quantizing (A/D conversion followed by D/A conversion) processes.

The fact that sampling and amplitude quantization of the analog signal at the input of element 50 is permitted offers a number of benefits. For one, it allows the signal to be presented to element 50 in digital format. For another, it permits simple multiplexing of different information sources. Thus, for example, elements 50, 60 and 90 can be implemented in accordance with present day modem realizations; i.e., with one or more microprocessors operating under stored program control.

Figure 9:
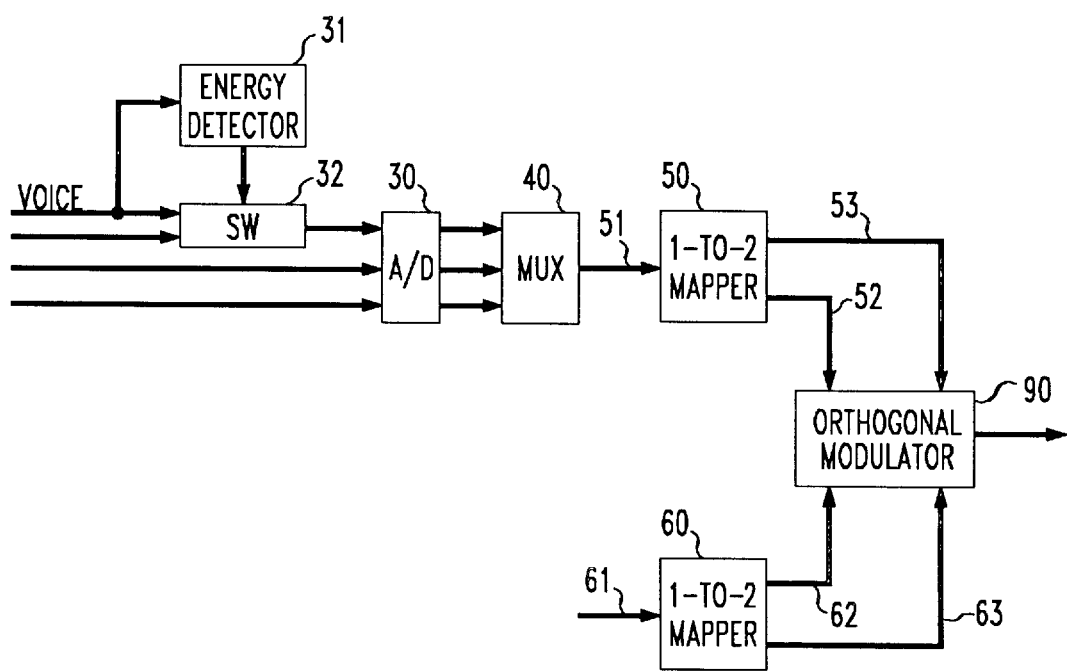
FIG. 9 illustrates the arrangements that permit more than one analog signal source to be transmitted simultaneously.

An example of input signal multiplexing is shown in FIG. 9, which presents an embodiment that includes an A/D converter bank 30 followed by a multiplexer 40. Converter bank 30 converts a plurality of analog signals, such as on lines 33 and 34, to digital format and multiplexer 40 multiplexes its input signals and applies them to element 50. Elements 30 and 40 are conventional A/D and multiplexer elements, respectively.

The combination of elements 30 and 40 allows applying a number of narrowband analog signals to orthogonal modulator 90. The primary limitations are the carrier frequency and the allowable transmission bandwidth of the channel. The narrowband signal can, of course, come from any source. For example, a system installed in an ambulance may sacrifice some voice bandwidth in order to allow narrowband telemetry data of blood pressure and heart pulse rate to be communicated concurrently with the voice.

Additionally, a voice signal energy detector may be included, such as disclosed in U.S. Pat. No. 5,081,647, which would detect periods of silence and send less urgent telemetry data during those silence periods. This is illustrated by elements 31 and 32 in FIG. 9.

The fact that the input to element 50 is digital (in a digital implementation of elements 50, 60 and 90) and that the input to element 60 is also digital should not be confused. The digital input to element 60 is a stream of digits that are each equally important. Hence, those digits are converted into symbols and the symbols into constellation points, and the constellation points are within neighborhoods which are identified by a slicer (e.g., slicer 220 in FIG. 1) within a modem's receiver section. In contradistinction, the digital signals applied to element 50 correspond to digital words that represent amplitude, and the specific interrelationship between adjacent bits of the digital words is maintained. As indicated above, the signal cloud around a signal point within a constellation does not represent a plurality of signal points that must be distinguished, and that is a fundamental distinction.

Figure 10:
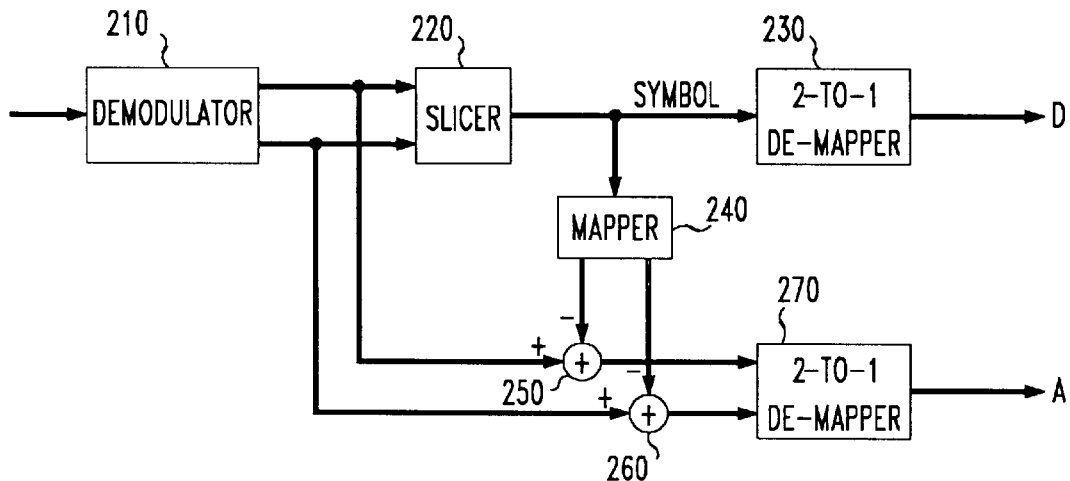
FIG. 10 details the major elements in a receiver in accordance with the principles of this invention.

FIG. 10 presents a basic block diagram of a modem's receiver section in conformance with the principles of this invention. The modulated input signal received from the channel is applied to demodulator 210 which develops the in-phase and quadrature components. Those are applied to slicer 220 which identifies the symbols, and the symbols are applied to de-mapper 230. All this is in accord with conventional modem approaches, as described in connection with FIG. 1. In addition, FIG. 10 includes a mapper 240 that is responsive to the symbols developed by slicer 220. The output of mapper 240 is an accurate estimate of the set of in-phase and quadrature components (that are applied in the FIG. 1 arrangement to elements 150 and 160). The outputs of mapper 240 are subtracted from the outputs of demodulator 210 in subtracters 250 and 260. The outputs of subtracters 250 and 260 are applied to 2-to-1 de-mapper 270 which recombines the analog samples to form an estimate of the original analog signal. De-mapper 270 performs the inverse function of mapper 50.

In may be noted that slicer 220 can be designed to directly provide the output signals that mapper 240 develops; and moreover, de-mapper 230 can be made responsive to such signals. That would alter the FIG. 10 in the sense that slicer 220 and mapper 240 would combine to form a single element and de-mapper 230 as well as adders 250 and 260 would be responsive to that combined element.

In analog realizations of this invention (e.g., FIG. 6), mapper 50 is responsive to analog signals. Various approaches can be taken to develop the plurality of outputs (two outputs, in the case of element 50 shown in the FIGS.). For example, a single bandlimited analog signal can be divided into a plurality of baseband signals by simply filtering and modulating selected sub-bands. Alternatively, element 50 can accept a plurality of bandlimited analog signals and assign each one of the plurality of bandlimited analog signals to different outputs of element 50.

In time sampled realizations of this invention (whether the realization continues with analog circuitry or digital circuitry), element 50 can simply route alternate samples of a single analog signal to different outputs of element 50, or multiplex a plurality of analog signals and distribute the samples of those signals in any convenient manner.

In order to allow for nonlinear techniques that may be employed to enhance the communication qualities of this invention, it is important to effect equalization of the channel in order to minimize intersymbol interference. Conventional modem technology can be brought to bear to this need.

Figure 11:
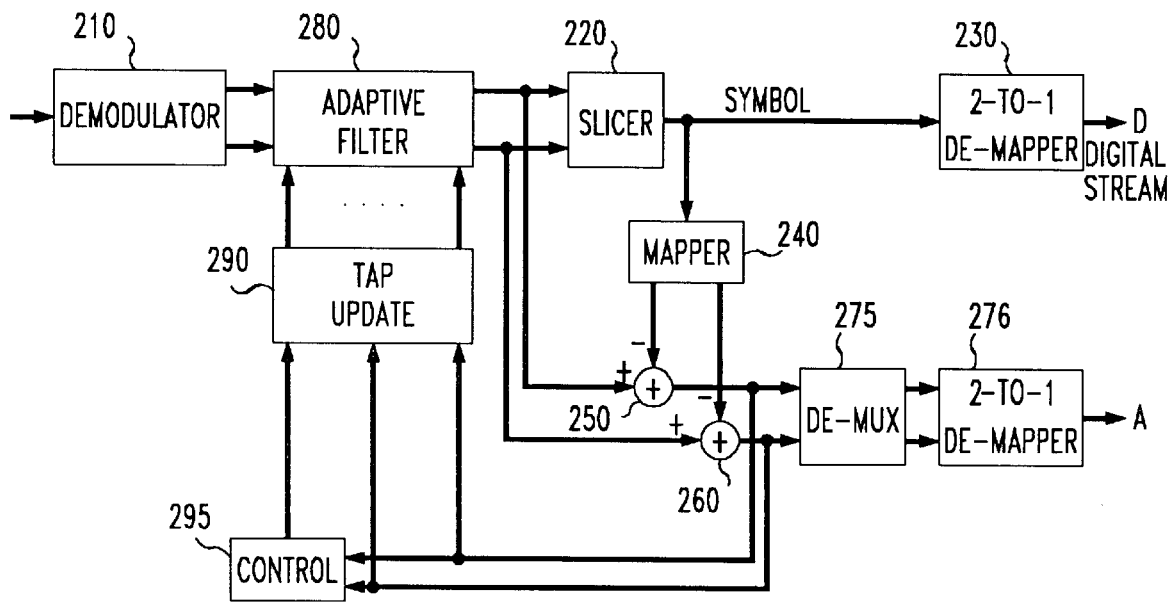
FIG. 11 presents a block diagram of a receiver that includes adaptive equalization.

FIG. 11 presents a block diagram of an arrangement that incorporates equalization. Specifically, FIG. 11 is depicted with a modulator that is followed by equalization hardware (which together can be thought of as a super-demodulator). The equalization hardware comprises an adaptive filter 280 that is interposed between demodulator 210 and slicer 220. The operational characteristics of filter 280 are controlled by filter coefficients that are stored—in modifiable form—within tap update block 290. Tap update block 290 is responsive to the output signals of subtracters 250 and 260. The adaptation of filter 280 is carried out in accordance with conventional modem techniques. The outputs of subtracters 250 and 260 are also applied to demultiplexer 275 and the outputs of demultiplexer 275 are applied to de-mapper 276. De-mapper 276 comprises a bank of de-mappers 270 of FIG. 10. Elements 275 and 276 are included to illustrate a receiver that is adapted for applications where a plurality of analog inputs are multiplexed. Of course, in applications where there is no multiplexing, de-mapper 270 can be substituted.

In accordance with some adaptation approaches, it is easiest to carry out adaptation and the corresponding coefficient updates when the power in the analog signal is small. To limit the process to such intervals, FIG. 11 includes a power detector within control element 295 that is responsive to subtracters 250 and 260. Block 295 is also conventional. It includes a power detection circuit that evaluates the power contained in the signals of subtracters 250 and 260 and delivers a control signal to block 290 to enable (or disable) the coefficient updating process. Of course, block 295 may be more generic, in that the control signal can be derived from other than the analog signal, such as from side information from the transmitter.

FIG. 11 depicts one arrangement for effecting equalization of the transmission channel between a sending modem's transmitter section and a receiving modem's receiver section; to wit, at the receiver's front end, following the demodulator. However, it is well known that equalization can be performed anywhere along the channel, going back even to within a modem's transmitter section.

Figure 12:
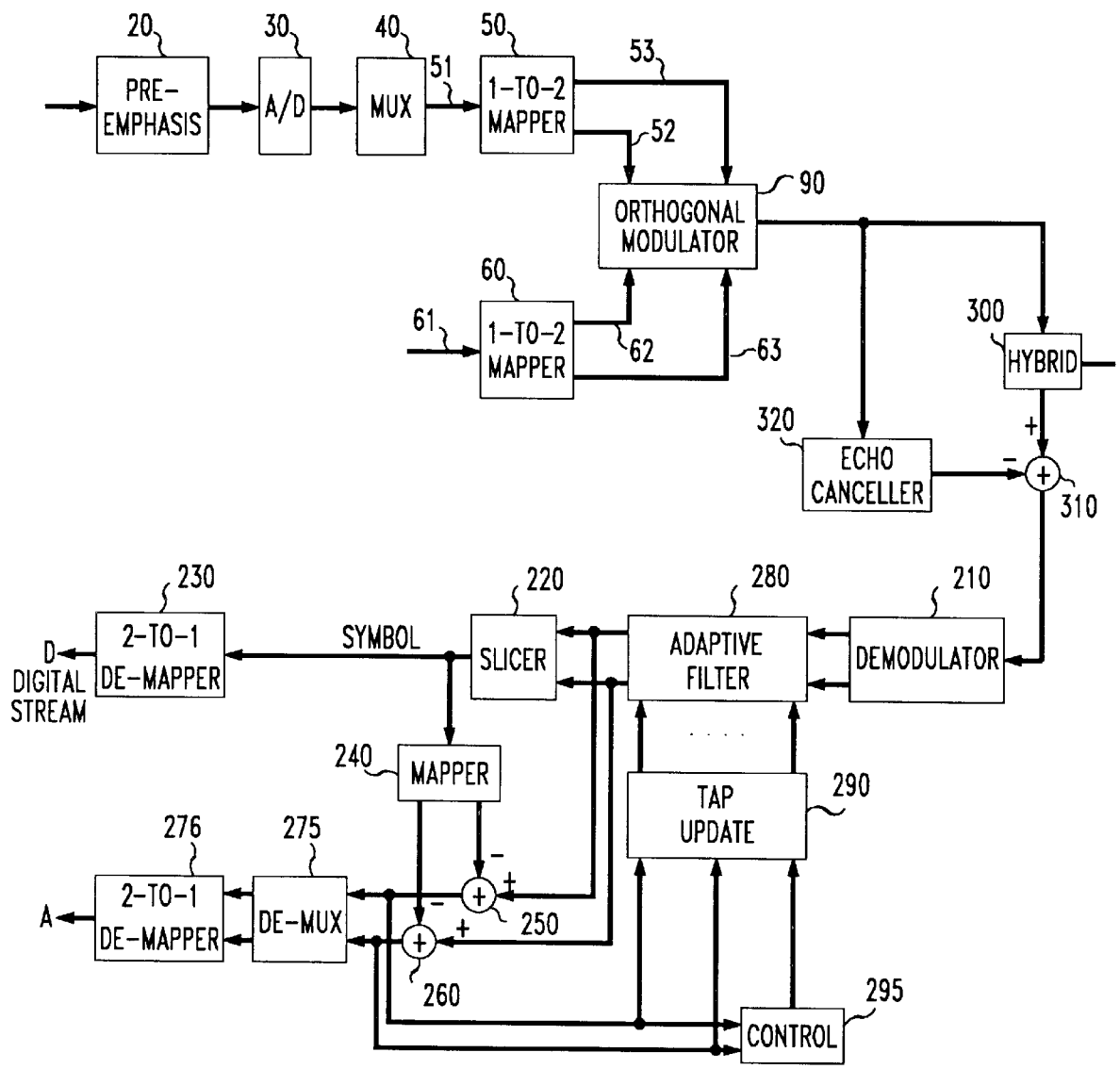
FIG. 12 presents the block diagram of an entire modem.
Figure 13:
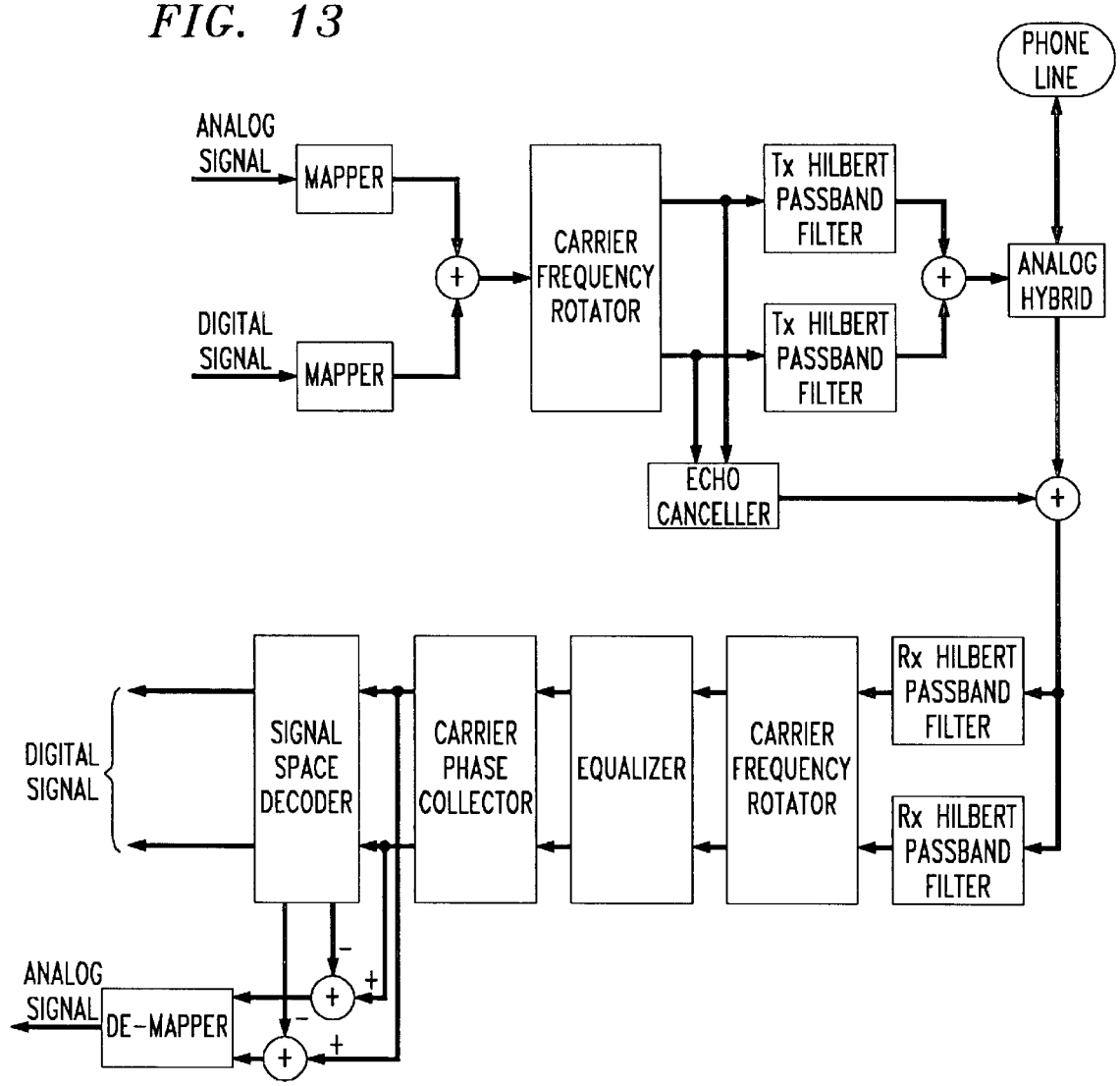
FIG. 13 presents a slightly different embodiment of the FIG. 12 modem.

FIG. 12 depicts the entire, full duplex, modem constructed in accordance with the depictions of FIGS. 9 and 11. More specifically, a transmitter section (FIG. 9) is coupled with a receiver section (FIG. 11) through hybrid 300 and subtracter 310. Subtracter 310 cooperates with echo canceller 320 in the conventional way to subtract unwanted signals from the signal applied to demodulator 210. For sake of simplicity, echo canceller 320 is shown to connected to the output of orthogonal modulator 90, and in analog embodiments of element 320 this is perfectly satisfactory. However, in digital embodiments it is well known that efficiencies can be realized by having the echo canceller be responsive to the outputs of mapper 60, where the signal rate is much lower. An improvement which incorporates the principles of this invention is shown in FIG. 13. It may be noted that some of the elements in FIG. 13 are designated by different labels; such as "Hilbert passband filter", which corresponds to a modulator, etc. These are circuits that attain the desired results through somewhat different calculations and are well known to persons skilled in the modem art.

The echo cancelling is performed, as in all modems, during a training period, when the far end signal source is silent and the echo canceller is adapted to minimize the output of subtracter 310.

Figure 14:
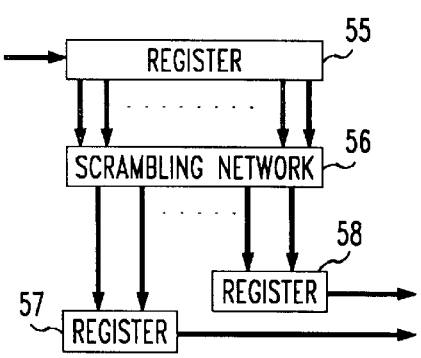
FIG. 14 depicts one structure for scrambling analog samples.

In connection with FIG. 6 it has been disclosed that the input to element 50 can be a sampled analog signal, as well as an unsampled analog signal. It has also been disclosed above that when element 50 is a 1-to-2 mapper (as compared to 1-to-N mapper) and the desired output of element 50 is pairs of a sampled analog signal, the pairs of analog samples can be derived by simply delaying the incoming analog signal by 1/B and sampling both the delayed and the undelayed versions at rate B. This provides sample pairs that correspond to adjacent samples of the original analog signal sampled at rate 1/2B seconds. Actually, privacy of the communication is enhanced when the samples are not adjacent, and FIG. 14 presents one approach for deriving pairs from non-adjacent samples. It basically includes an input register 55 for storing K analog samples that arrive at rate 2B, a scrambling network 56 that scrambles the outputs of register 55 and develops K outputs, and registers 57 and 58 that are responsive to the outputs of network 56. Registers 57 and 58 store K/2 analog samples every K/2B seconds and output the stored samples at rate 1/2B seconds. Scrambling network 56 may be simply a cross-connect field.

The above described a number of embodiments that illustrate the principles of this invention. Of course, other embodiments are possible and other elements can be included to enhance operation of the embodiments. For example, the "analog" input that enters orthogonal modulator 90 can be filtered to pre-emphasize the high frequencies and, correspondingly, the "analog" output of subtracters 250 and 260 can be filtered to remove the pre-emphasis. The preemphasis can be effected, for example, within the A/D converter 30 or even prior thereto, such as in pre-emphasis filter 20 shown in FIG. 12. The filtering can be done while the "analog" signal is truly analog, or it could be done when the "analog" signal is represented digitally—such as when the transmitter and receiver sections are effected with digital hardware.

Other configurations are possible and other elements can be included to enhance operation of the configurations. For example, the "analog" input that enters orthogonal modulator 90 can be filtered to pre-emphasize the high frequencies and, correspondingly, the "analog" output of subtracters 250 and 260 can be filtered to remove the pre-emphasis. The preemphasis can be effected, for example, within the A/D converter 30 or even prior thereto, such as in pre-emphasis filter 20 shown in FIG. 12. The filtering can be done while the "analog" signal is truly analog, or it could be done when the "analog" signal is represented digitally—such as when the transmitter and receiver sections are effected with digital hardware.

Figure 15:
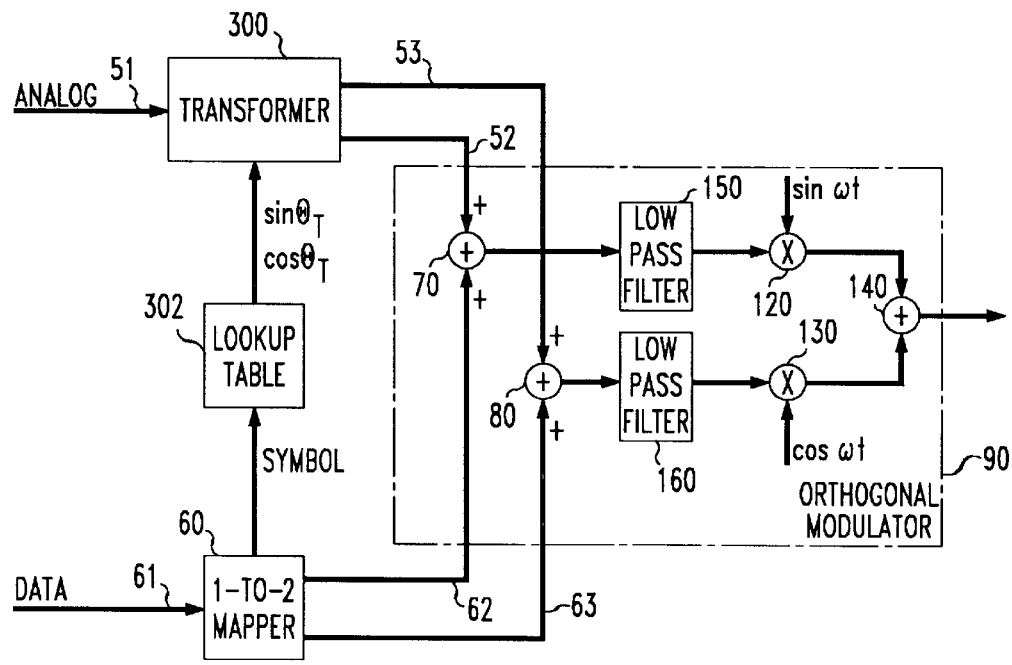
FIG. 15 is a block diagram illustrating the transmitter of a communication system providing improved phase immunity to an analog signal.

FIG. 15 illustrates the transmitter of the present invention. FIG. 15 is similar to FIG. 6 except that one-to-two encoder or mapper 50 has been replaced with encoder/transformer 300. Encoder/transformer 300 introduces a phase shift to the analog signal based on the signal point or symbol provided by mapper 60. The phase shift values are obtained from look up table 302 which is addressed by a symbol from mapper 60 or a data signal which specifies a symbol from mapper 60. As discussed with regard to FIG. 6, the output signals from transformer 300 and mapper 60 are added, modulated and transmitted over a communication channel.

Figure 16:
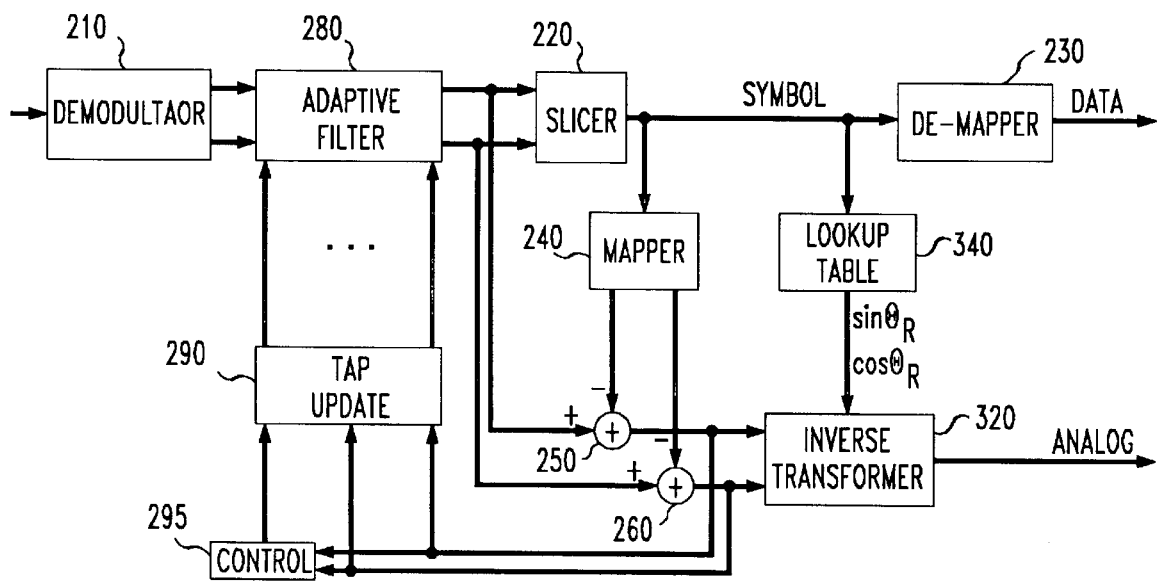
FIG. 16 illustrates the receiver of a communication system providing improved phase immunity to an analog signal.

FIG. 16 illustrates the receiver of a communication system embodying the present invention. The receiver of FIG. 16 is similar to the receiver of FIG. 11 except that de-mux 275 is not included and decoder/inverse transformer 320 replaces two-to-one demapper or decoder 276. In a fashion similar to FIG. 11, the signal from the communication channel is demodulated so that the identity of a signal point specified by the received signal can be determined. The identity of the signal point is used to separate the analog and data signals so that the analog signal can be passed through inverse transformer 320. Inverse transformer 320 introduces a phase shift specified by reference look-up table 340. The phase shift is based on the identity of the signal point or symbol provided by slicer 220. It is also possible to use the output of mapper 240 to obtain a phase shift from look-up table 340. Look-up table 340 may be fabricated using RAM or ROM. Inverse transformer 320 also carries out a two-to-one decode to produce the analog signal. The two-to-one decode is the same as was carried out by demapper or decoder 270 of FIG. 10.

Figure 17:
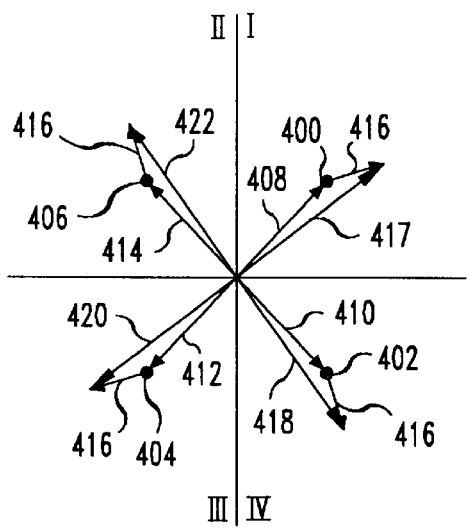
FIG. 17 illustrates a transmitted four signal point or symbol constellation with a phase-shifted analog signal added to each point.

FIG. 17 illustrates a signal space containing four signal points specified by data signals represented by vectors. Signal points 400, 402, 404 and 406 are specified by data signals 408, 410, 412 and 414, respectively. In preparation for transmission, analog signal 416 is phase shifted and added to the data signal provided by mapper 60. To illustrate the relationship between the data signal and the phase shift added to analog signal 416, FIG. 17 shows analog signal 416 added to each of the four data signals that specify a four signal point constellation. When the data signal specifies a signal point in quadrant I, II, III or IV, analog signal 416 is phase-shifted by 0 degrees, 90 degrees, 180 degrees or 270 degrees, respectively. In other words, when analog signal 416 is to be added to data signals 408, 414, 412 or 410, analog signal 416 is phase shifted by 0 degrees, 90 degrees, 180 degrees or 270 degrees, respectively. This addition produces signals 417, 422, 420 and 418, which are transmitted through a communication channel that adds a phase shift of (n×90°) +ψ.

Equalization includes determining the amount of phase shift (−ψ) that must be added to a received signal so that the total phase shift introduced by the channel and adaptive filter is a multiple of 90 degrees. This can be accomplished by sending a data signal without an analog signal and determining the phase shift required to align the received signal with the nearest signal point. In normal operation, a phase shift of −ψ is added to received signal by adaptive filter 280. Adding a phase shift to a received signal so that the total phase shift is a multiple of 90 degrees is well known in the modem art. As a result, when using a four signal point constellation, we only have to compensate for phase shifts of 0 degrees, 90 degrees, 180 degrees, and 270 degrees.

Figure 18:
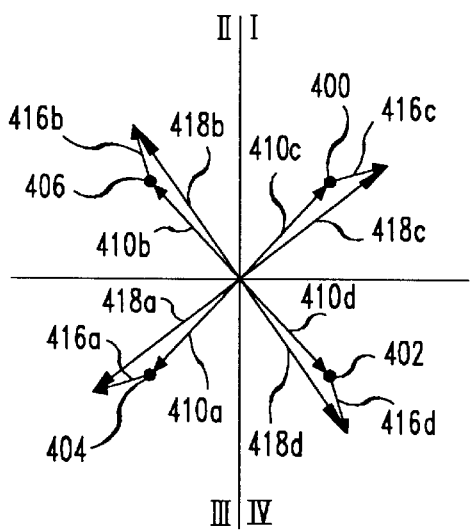
FIG. 18 illustrates a received four signal point or symbol constellation with a phase-shifted analog signal added to each point.

As an example, FIG. 18 illustrates the phase of signal 418 for four different communication channels, after signal 418 has been transmitted through the channel and phase shifted by adaptive filter 280. The first channel shifts signal 418 by 90+ψ degrees to produce data signal 410c and analog signal 416c. The second channel shifts signal 418 by 180+ψ degrees to produce data signal 410b and analog signal 416b. The third channel shifts signal 418 by 270+ψ degrees to produce data signal 410a and analog signal 416a. The fourth channel shifts signal 418 by 0+ψ degrees to produce data signal 410d and analog signal 416d.

The present invention compensates for these phase shifts by adding a phase shift to the received analog signal based on the received signal point or symbol specified by the received data signal. A phase shift of 90 degrees, 180 degrees, 270 degrees and 0 degrees is added to analog signals received with data signals specifying received signal points 402, 404, 406 and 400, respectively. In other words, a phase shift of 90 degrees, 180 degrees, 270 degrees and 0 degrees is added to analog signals 416d, 416a, 416b and 416c, respectively. Adding these phase shifts compensates for the phase shift added by transformer/encoder 300 and for the remaining portion of the phase shift added by the communication channel. (Recall that adaptive filter 280 compensates for the ψ degree portion of the channel phase shift).

Received data signals 408, 412 and 414, and their associated analog signals are treated similarly. As discussed with regard to received data signal 410, a phase shift of 90 degrees, 180 degrees, 270 degrees and 0 degrees is added to analog signals received with data signals specifying received signal points 402, 404, 406 and 400, respectively. These phase shifts compensate for phase shift added by transformer/encoder 300 and for the remaining phase shift added by the communication channel.

The modification to the analog signal by transformer 300 and inverse transformer 320 may change the phase and/or amplitude of the analog signal. It is also possible to change one or more components of the analog signal. For example, based on the data signal or symbol specified by the data signal, the I component of the analog signal may be scaled while the Q component is not changed. The components of the analog signal may be changed independently of each other or dependent on each other. It is also possible to modify the analog signal based on a particular characteristic of the data signal. Such characteristics may include the data signal's amplitude and/or phase, or the value of a particular component of the data signal. In addition, the analog signal may be modified based on a characteristic of the analog signal, or on a combination of data signal and analog signal characteristics.

In some situations, inverse transformer 320 does not perform a precise inverse transform of the transform that was carried out by transformer 300. Inverse transformer 320 may introduce signal processing such as scaling or filtering.

Figure 19:
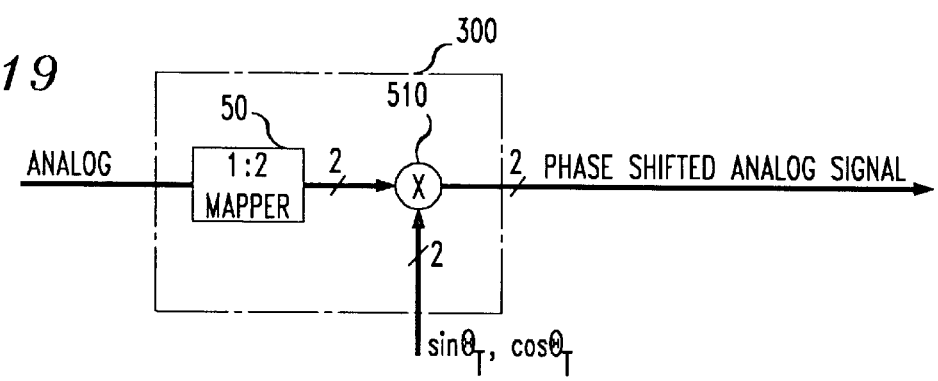
FIG. 19 is a block diagram of an encoder/transformer.

FIG. 19 illustrates one embodiment of transformer 300. Transformer 300 comprises one-to-two encoder or mapper 50 and complex multiplier 510. Complex multiplier 510 can be constructed using four digital or analog multipliers in a manner that is well known in the art. Complex multiplier 510 receives the two-dimensional analog signal (I and Q components) from one-to-two mapper 50. Complex multiplier 510 also receives the sine and cosine of the phase shift that will be added to the analog signal from look-up table 302. The phase shifted analog signal is produced at the output of complex multiplier 510.

Figure 20:
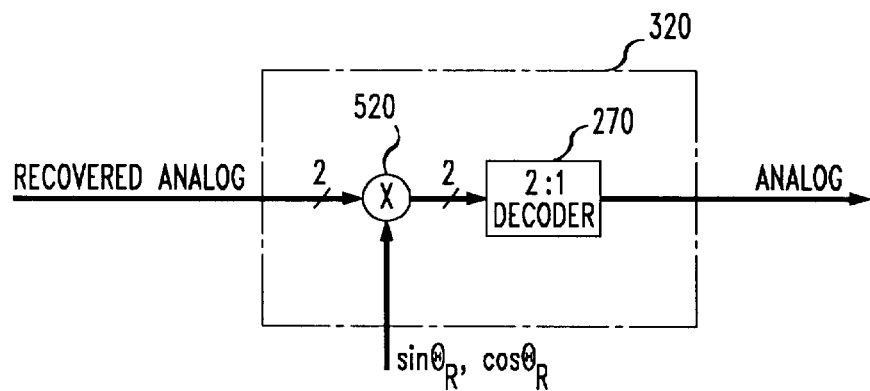
FIG. 20 is a block diagram of a decoder/inverse transformer.

FIG. 20 illustrates inverse transformer 320. The two-dimensional analog signal that has been recovered from the received signal is presented at the input of inverse transformer 320. The recovered analog signal is received at one input of complex multiplier 520, and the sine and cosine of the phase shift that will be added to the recovered analog signal is received from look-up table 340 at the second input of complex multiplier 520. Complex multiplier 520 multiplies the analog signal by the sine and cosine of the phase shift angle to produce an analog signal that has a phase shift that compensates for the phase shift introduced by transformer 300 and the communication channel. Complex multiplier 520 can be constructed using four digital or analog multipliers in a manner that is well known in the art. It is also possible to carry out this function using an appropriately programmed microprocessor or microcomputer. The analog signal at the output of complex multiplier 520 is passed through two-to-one decoder or demapper 270 to produce an output analog signal.

In the case of a four-point symbol constellation, the phase shift introduced by transformer 300 can be represented by $\Theta_T+\Theta_C$ where $\Theta_T$ is the phase of the data signal that will be summed with the analog signal and $\Theta_C$ is an arbitrary constant phase offset. The phase shift introduced by inverse transformer 320 can be represented as $360°-\Theta_R-\Theta_C$ where $\Theta_R$ is the phase associated with the signal point specified by one or more characteristics of the received data signal, and $\Theta_C$ is the arbitrary constant phase offset.

Figure 21:
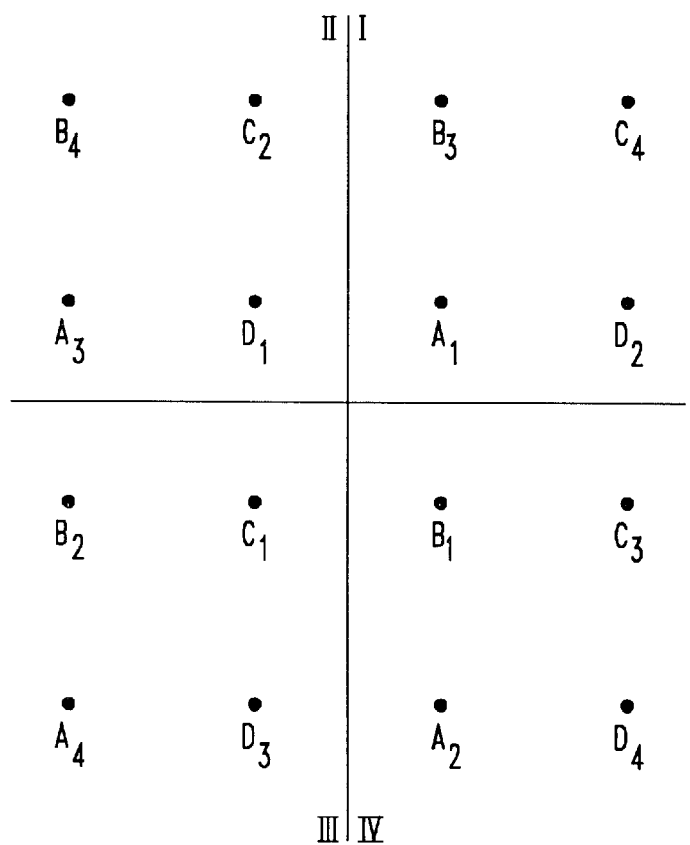
FIG. 21 illustrates a 16 point signal constellation.

It is also possible to modify analog signals that are added to signals that specify signal points belonging to more complex constellations. For example, FIG. 21 illustrates a 16 signal point constellation. In this case, the phase shift introduced by transformer 300 can be represented by $\Theta_T+\Theta_C$ where $\Theta_T$ is 0°, 90°, 180° or 270° when the data signal that will be summed with the analog signal is in quadrant I, II, III or IV, respectively, and where $\Theta_C$ is an arbitrary constant phase offset. The phase shift introduced by inverse transformer 320 can be represented by $360°-\Theta_R-\Theta_C$ where $\Theta_R$ is 0°, 270°, 180° or 90° when the data point specified by the received data signal is in quadrant I, II, III or IV, respectively, and where $\Theta_C$ is the arbitrary constant phase offset. It should be noted that any quadrant may be called I, and that quadrants II through IV can be identified by proceeding in either a clockwise or counter-clockwise direction from quadrant I; however the quadrants should be defined in the same manner at the receiving end of the communication channel. It should also be noted that $\Theta_C$ does not have to be the same for all signal points; however, it should be the same within signal point groups $A_1-D_1$, $A_2-D_2$, $A_3-D_3$ and $A_4-D_4$.

Figure 22:
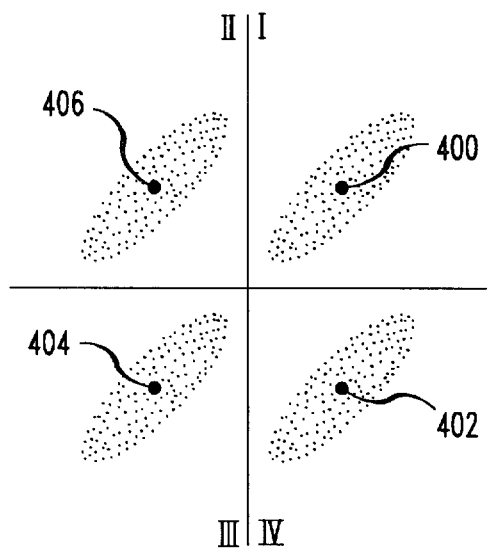
FIG. 22 illustrates elliptical patterns which result when a combined voice signal and data signal are integrated over time.
Figure 23:
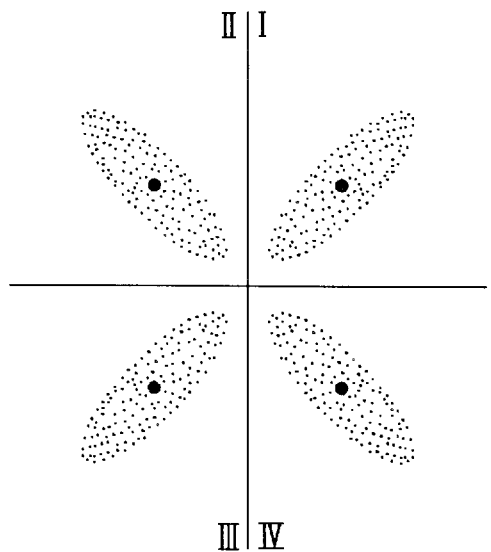
FIG. 23 illustrates elliptical patterns which result when a combined phase shifted voice signal and a data signal are integrated over time.

The present invention may decrease the probability of misidentifying a signal point by improving the placement of the combined analog and data signal. When the I and Q components of the analog signal are adjacent time samples of a voice signal, the components may be correlated. As a result, the combined data and analog signals form elliptical patterns around each data point of the signal constellation. FIG. 22 illustrates the elliptical patterns that form when the combined voice and data signal are integrated over time. When using the quadrant in which a signal is located as a basis for identifying the transmitted signal point, an inspection of FIG. 22 reveals that signal points associated with quadrants I and III are less likely to be misidentified than signal points associated with quadrants II and IV. As discussed earlier, analog signals added to data signals specifying signal points 400, 406, 404 and 402, are phase shifted by 0 degrees, 90 degrees, 180 degrees and 270 degrees, respectively. FIG. 23 illustrates the improved placement of the combined analog and data signal that results from the phase shifts. The improved placement changes the orientation of the elliptical pattern in quadrants II and IV, and thereby decreases the probability of misidentifying signal points associated with quadrants II and IV.

We claim:

1. A communication method comprising the steps of:

introducing a first phase change to an analog signal based on a value obtained from a look up table, said value being derived from a symbol specified by a data signal to form a modified first signal, said symbol being one of a plurality of symbols in a symbol constellation;

adding said modified analog signal to said data signal to form a combined signal;

transmitting said combined signal over a communication channel that introduces a channel phase change to said modified analog signal and said data signal to form a phase changed combined signal;

receiving said phase changed combined signal comprising a phase changed modified analog signal and a phase changed data signal;

identifying received symbol using said phase changed combined signal; and introducing a phase shift to said phase changed modified analog signal based on said received symbol to remove said first phase change and at least a portion of said channel phase change.

2. The communication method of claim 1 wherein said analog modified signal is a modified two dimensional analog signal and said data signal is a two dimensional data signal.

3. A communication method comprising the steps of:

introducing a first phase change to an analog signal based on a symbol specified by a data signal to form a modified first signal, said symbol being one of a plurality of symbols in a symbol constellation;

adding said modified analog signal to said data signal to form a combined signal;

transmitting said combined signal over a communication channel that introduces a channel phase change to said modified analog signal and said data signal to form a phase changed combined signal;

receiving said phase changed combined signal comprising a phase changed modified analog signal and a phase changed data signal;

identifying a received symbol using said phase changed combined signal; and introducing a phase shift to said phase changed modified analog signal to remove said first phase change and at least a portion of said channel phase change, said phase shift being derived from a value obtained from a look up table, said value being derived from said received symbol.

4. The communication method of claim 3 wherein said analog modified signal is a modified two dimensional analog signal and said data signal is a two dimensional data signal.

5. A communication method comprising the steps of:

introducing a first phase change to an analog signal based on a value obtained from a look up table, said value being derived from a symbol specified by a data signal to form a modified first signal, said symbol being one of a plurality of symbols in a symbol constellation;

adding said modified analog signal to said data signal to form a combined signal;

transmitting said combined signal over a communication channel that introduces a channel phase change to said modified analog signal and said data signal to form a phase changed combined signal;

receiving said phase changed combined signal comprising a phase changed modified analog signal and a phase changed data signal;

identifying a received symbol using said phase changed combined signal; and introducing a phase shift to said phase changed modified analog signal to remove said first phase change and at least a portion of said channel phase change, said phase shift being derived from a value obtained from a look up table, said value being derived from said received symbol.

6. The communication method of claim 5 wherein said analog modified signal is a modified two dimensional analog signal and said data signal is a two dimensional data signal.

* * * * *